United States Patent
Hager et al.

(10) Patent No.: US 6,362,776 B1
(45) Date of Patent: Mar. 26, 2002

(54) PRECISION RADAR ALTIMETER WITH TERRAIN FEATURE COORDINATE LOCATION CAPABILITY

(75) Inventors: James R. Hager, Golden Valley; Curtis J. Petrich; Larry D. Almsted, both of Minneapolis, all of MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/498,930

(22) Filed: Feb. 4, 2000

(51) Int. Cl.[7] .............................................. G01S 13/08
(52) U.S. Cl. ....................................... 342/121; 342/120
(58) Field of Search ................................ 342/118, 120, 342/121, 123; 367/87, 99

(56) References Cited

U.S. PATENT DOCUMENTS

| | | | |
|---|---|---|---|
| 4,427,981 A | * | 1/1984 | Kyiakos ..................... 342/120 |
| 4,514,733 A | * | 4/1985 | Schmidtlein et al. ........ 342/120 |
| 4,733,239 A | * | 3/1988 | Schmitt ...................... 342/122 |
| 5,260,708 A | * | 11/1993 | Auterman ................... 342/25 |
| 5,781,148 A | * | 7/1998 | Severwright ............... 342/120 |
| 6,025,800 A | | 2/2000 | Hager |

* cited by examiner

Primary Examiner—Ian J. Lobo
(74) Attorney, Agent, or Firm—Dennis C. Bremer

(57) ABSTRACT

A radar altimeter for determining altitude of an air vehicle comprises a transmitter for transmitting radar signals toward the ground. A first and a second antenna receive reflected radar signals from the ground. A signal processor is coupled to the first and the second antennas. The signal processor includes filter means for rejecting signals other than signals reflected from a selected ground swath. The signal processor determines the above ground level altitude of the air vehicle based on the radar signals output from the filter means. A phase ambiguity resolution means resolves phase ambiguities that arise due to multiple wavelength separation of the first and the second antenna. The signal processor also determines the horizontal position of the highest point in the selected ground swath. In a preferred embodiment, the phase ambiguity resolution means comprises a third antenna spaced closely to the first antenna such that there are no phase ambiguities between the reflected radar signals received by the third antenna and the first antenna.

21 Claims, 4 Drawing Sheets

PRECISION RADAR ALTIMETER WITH TERRAIN FEATURE COORDINATE LOCATION CAPABILITY

CROSS-REFERENCE TO RELATED APPLICATION(S)

None.

BACKGROUND OF THE INVENTION

The present invention relates to a radar altimeter, and more particularly to a precision radar altimeter with terrain feature coordinate location capability.

The precision radar altimeter of the present invention "looks" at the ground in a series of swaths, using doppler band pass filters to focus in on one swath at a time. Return signals are received by a pair of antennas. The location of the highest point within a particular swath is determined by performing phase comparisons of the return signals received by the two antennas. If the highest point being illuminated by radar is directly below the air vehicle, then the return signal will come back at the same time to both antennas. On the other hand, if the highest point is off to one side of the air vehicle, the return signal will come back to one antenna before it comes back to the second antenna, because the path is longer for the second antenna. The phase or the time of arrival of the return signals at each of the antennas are compared. The greater the distance between the two antennas, the more accurate the measurement will be. However, as the distance between the two antennas increases, one or more phase ambiguities result.

A phase ambiguity may be understood in the context of a phasor. A phasor repeats every 360 degrees. Therefore, 370 degrees will appear the same as 10 degrees, 380 degrees will appear the same as 20 degrees, and so on. The further apart the two antennas are spaced, the more phase ambiguities will result. Very complex, costly and power consuming ambiguity reducing algorithms are typically incorporated into systems to reduce or eliminate the phase ambiguities. Furthermore, existing systems are "side-looking", meaning that the antennas for the radar are pointed off to the side of the air vehicle. Side-looking systems process all range cells within a doppler swath, which requires a high level of processing, resulting in large and costly systems. These side-looking radars generate elevation features of the entire area off to the side of the vehicle. These features are correlated with existing electronic terrain elevation maps for navigation purposes. Additionally, the side-pointing antennas must be configured to not illuminate the terrain on the opposite side of the vehicle during roll maneuvers, resulting in rather complex antenna steering mechanisms. The size, weight and cost of existing systems makes it difficult to incorporate the systems on small and medium sized air vehicles.

It would be desirable to use a less complex down-looking radar altimeter system that eliminates phase ambiguities in a more efficient manner, provides the capability to distinguish left targets from right targets, and processes swaths in a more efficient manner by processing only a single range cell within a swath, while maintaining a high degree of accuracy. Furthermore, the capability to distinguish left targets from right targets allows incorporation of standard, low cost, wide beam, radar altimeter antennas. It would also be desirable for a radar altimeter system to improve processing efficiency by processing multiple swaths at one time. A range determination would be calculated for a first swath, while simultaneously performing phase comparisons for a second swath.

BRIEF SUMMARY OF THE INVENTION

A radar altimeter system and method for determining terrain feature location and altitude of an air vehicle comprises a transmitter for transmitting radar signals toward the ground. A first and a second antenna receive reflected radar signals from the ground. A signal processor is coupled to the first and the second antennas. The signal processor includes doppler filter means for rejecting signals other than signals reflected from a selected ground swath. The signal processor determines the above ground level altitude of the air vehicle based on the radar signals output from the filter means. A phase ambiguity resolution means resolves phase ambiguities that arise due to multiple wavelength separation of the first and the second antenna. The signal processor also determines the position of the highest point in the selected ground swath. In a preferred embodiment, the phase ambiguity resolution means comprises a third antenna spaced closely to the first antenna such that there are no phase ambiguities between the reflected radar signals received by the third antenna and the first antenna.

The radar altimeter system of the present invention provides a simplified and efficient means for eliminating phase ambiguities, while maintaining a high degree of accuracy. In addition, processing efficiency is improved because multiple swaths are processed at the same time, and only a single target (the highest target) is processed. In a preferred embodiment, a range determination is calculated for a first swath, while simultaneously performing phase comparisons for a second swath.

DETAILED DESCRIPTION

Figure 1:
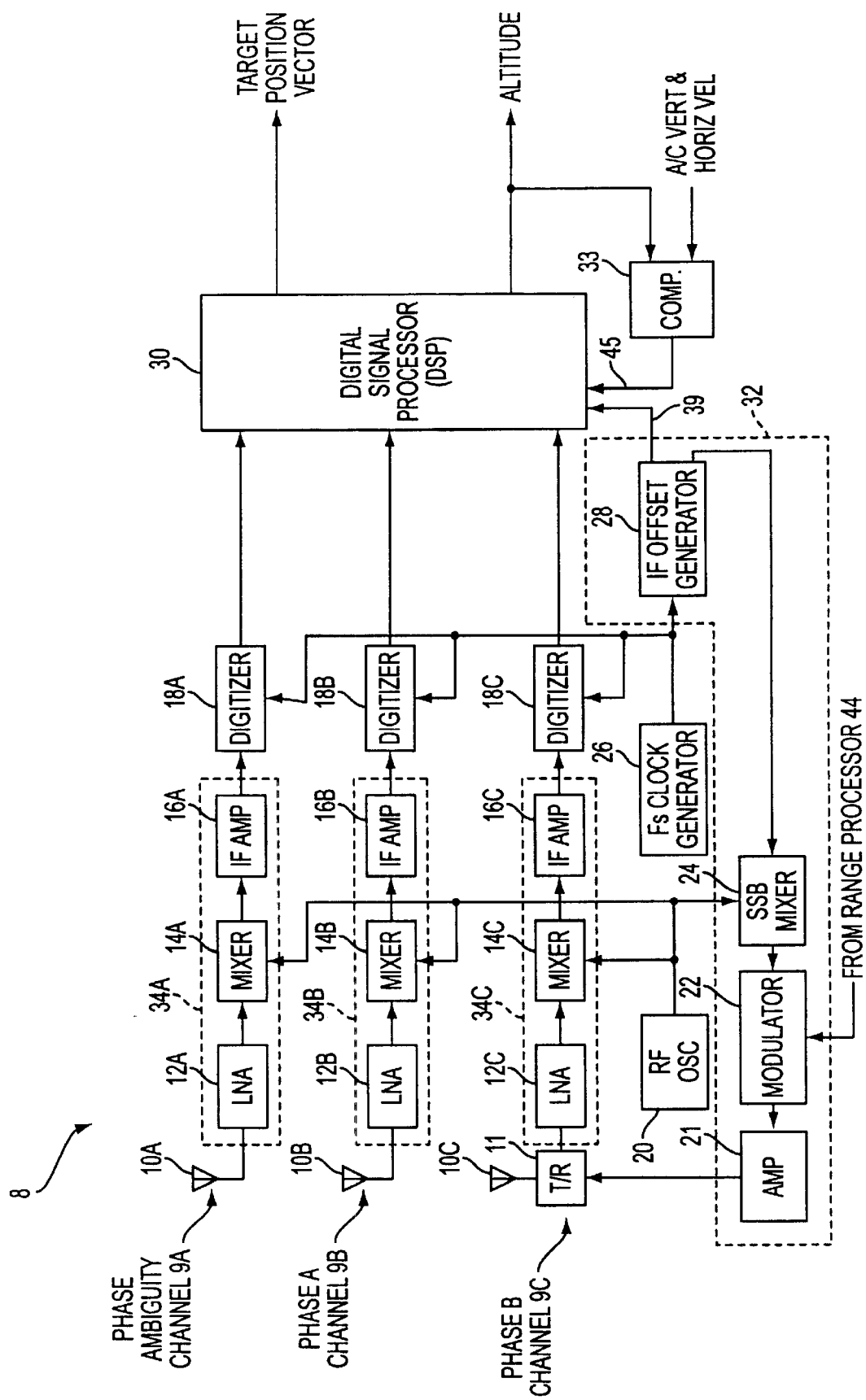
FIG. 1 shows a block diagram of a radar altimeter according to the present invention.

FIG. 1 shows a block diagram of a precision radar altimeter according to the present invention. In a preferred embodiment, radar altimeter 8 is incorporated in an air vehicle. Radar altimeter 8 includes three channels—phase ambiguity channel 9A, phase A channel 9B and phase B channel 9C. Channel 9A includes antenna 10A, receiver 34A and digitizer 18A. Receiver 34A includes low noise amplifier (LNA) 12A, mixer 14A and intermediate frequency (IF) amplifier 16A. Channel 9B includes antenna 10B, receiver 34B and digitizer 18B. Receiver 34B includes LNA 12B, mixer 14B and IF amplifier 16B. Channel 9C includes antenna 10C, transmit/receive switch 11, receiver 34C and digitizer 18C. Receiver 34C includes LNA 12C, mixer 14C and IF amplifier 16C. Transmit/receive switch 11 in channel 9C allows channel 9C to operate in either a transmit mode or a receive mode.

Radar altimeter 8 further includes RF oscillator 20, clock generator 26, transmitter 32, digital signal processor (DSP) 30 and computer 33. Transmitter 32 includes power amplifier 21, modulator 22, single side band (SSB) mixer 24 and intermediate frequency (IF) offset generator 28. RF oscillator 20 is coupled to mixers 14A–14C and SSB mixer 24. Clock generator 26 is coupled to digitizers 18A–18C and IF offset generator 28.

The radar altimeter of the present invention provides cross-track and vertical distance to the highest object below the air vehicle in, for example, ten foot wide down-track swaths, which are bounded by an antenna pattern that is approximately 46 degrees wide in the cross-track direction. "Down-track" means in the direction of travel. "Cross-track" means perpendicular to the direction of travel. Other antenna patterns and swath characteristics may be used. The downtrack width of a swath varies with the altitude of the air vehicle.

A first step performed by radar altimeter 8 is to transmit a radar signal toward the ground. Clock generator 26 provides a clock signal to IF offset generator 28. In a preferred embodiment, clock generator 26 operates at a frequency of 120 MHz, although other frequencies may be used. IF offset generator 28 generates an offset signal for the radar transmission signal. In a preferred embodiment, offset generator 28 divides the input clock signal from clock generator 26 by four, and outputs a clock signal at 30 MHz. SSB mixer 24 mixes the 30 MHz clock signal from IF offset generator 28 with an RF signal from RF oscillator 20, resulting in a 30 MHz offset of the RF signal. SSB mixer 24 outputs the offset signal to modulator 22. RF oscillator 20 preferably operates at about 4.3 GHz. Modulator 22 receives transmit code data from range processor 44 (shown in FIG. 2), and pulse modulates and phase modulates the signal received from SSB mixer 24 and outputs the modulated signal to power amplifier 21. Power amplifier 21 amplifies the received signal and outputs the amplified signal to antenna 10C through transmit/receive switch 11. Antenna 10C transmits the modulated signal toward ground. In a preferred embodiment, transmitter 32 transmits approximately 600 pulses in intervals of 12 msec, with a pulse separation of about 20 µs. Other frequencies and pulse separations may be used.

After a radar signal is transmitted by channel 9C, the signal reflected from the ground is received by antennas 10A–10C and is processed by the components of each of channels 9A–9C. LNA 12C, mixer 14C, IF amplifier 16C and digitizer 18C in channel 9C are the same as the corresponding components in channels 9A and 9B, so each channel 9A–9C (collectively referred to as channels 9) performs the same functions as the other channels. Therefore, the functions performed by each one of channels 9 will be discussed only with respect to channel 9C with the understanding that channels 9A and 9B operate in the same manner in receiving and processing signals.

The return signal received by antenna 10C passes through transmit/receive switch 11 and is amplified by LNA 12C. Mixer 14C mixes the amplified return signal with the RF oscillator signal output by RF oscillator 20, and outputs an IF offset signal to IF amplifier 16C. The IF offset signal is amplified by IF amplifier 16C and output to digitizer 18C. Digitizer 18C digitizes the received signal and outputs the digitized signal to DSP 30. The frequency of clock generator 26 determines the rate that the incoming analog signals on channels 9A–9C are sampled and digitized by digitizers 18A–18C.

Computer 33 receives air vehicle or aircraft (A/C) vertical and horizontal velocity data from the air vehicle's inertial navigation system (INS). Computer 33 processes the velocity data and outputs control signals to DSP 30 on control lines 45. DSP 30 outputs target position vectors identifying the position of the highest point within particular regions or "swaths" on the ground, and also outputs above ground level (AGL) altitude data that identifies the vehicle altitude.

Figure 2:
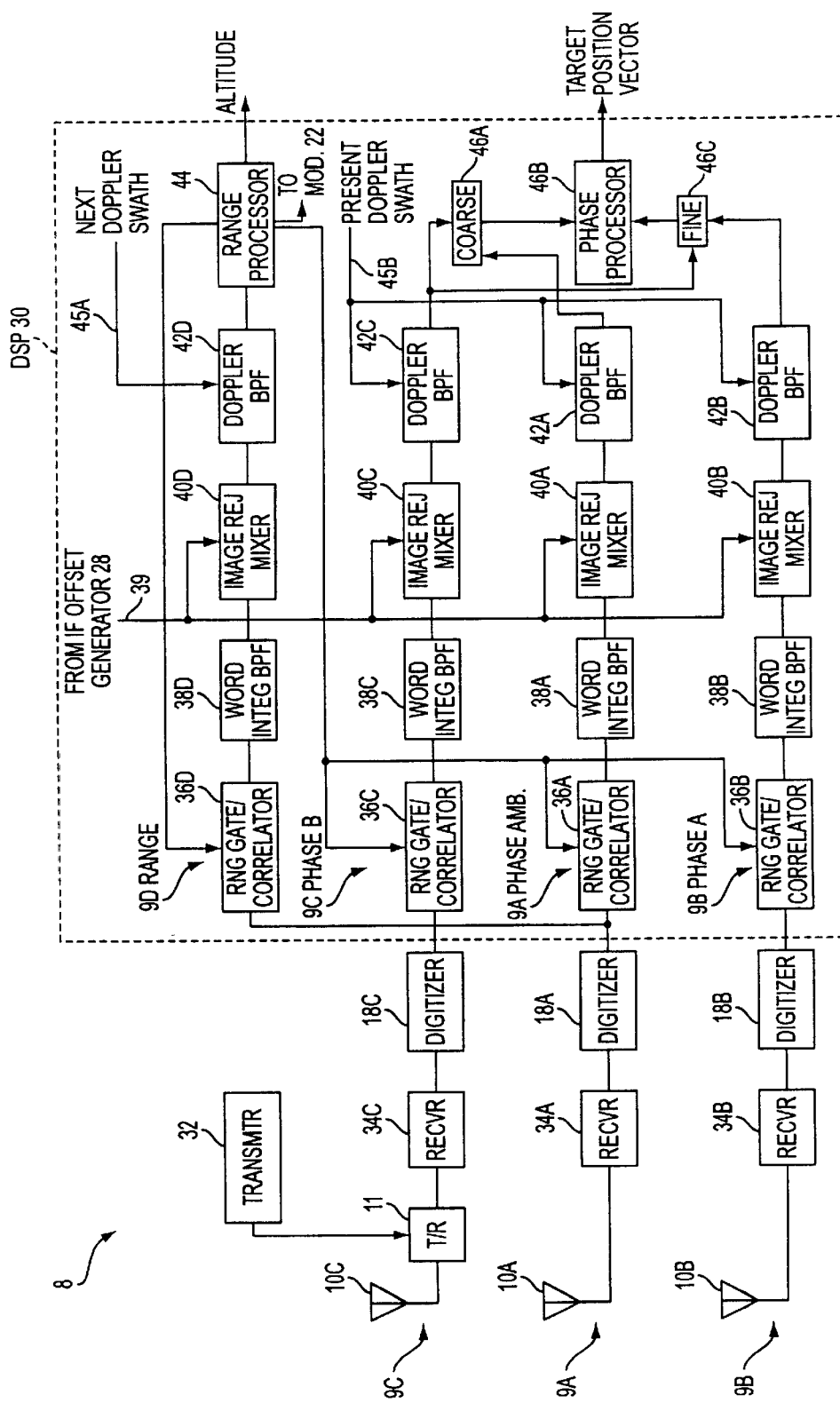
FIG. 2 shows a second block diagram of the radar altimeter of the present invention, including additional detail regarding the digital signal processor.

FIG. 2 shows a second block diagram of the radar altimeter of the present invention, including additional detail regarding DSP 30. RF oscillator 20, clock 26 and computer 33 are not shown in FIG. 2 in order to simplify the diagram and provide additional space for other components. DSP 30 includes range gate/correlators 36A–36D, word integration band pass filters (BPFs) 38A–38D, image reject mixers 40A–40D, doppler band pass filters (BPFs) 42A–42D, range processor 44, coarse phase processor 46A, coordinate location processor 46B and fine phase processor 46C. Coarse phase processor 46A, coordinate location processor 46B and fine phase processor 46C are collectively referred to as phase processor 46. DSP 30 includes 4 channels—range channel 9D, phase B channel 9C, phase ambiguity channel 9A and phase A channel 9B. Range channel 9D includes blocks 36D–42D and 44. Phase B channel 9C includes blocks 36C–42C. Phase ambiguity channel 9A includes blocks 36A–42A. Phase A channel 9B includes blocks 36B–42B.

When a radar signal is transmitted down to the ground, the return signal comes back at the same frequency as the transmitted signal with a doppler shift. If the radar is looking ahead, the return signal will be shifted up in frequency. If the radar is looking behind, the return signal will be shifted down in frequency.

By properly adjusting doppler band pass filters 42A–42D, any point on the ground can be selected and bounded. Therefore, only return signals from that one selected ground swath are looked at. Each swath is preferably approximately 10 feet wide down-track at 3,000 feet, and increases to approximately 20 feet wide at 8,000 feet.

The horizontal location of the highest point within a particular swath is determined by performing phase comparisons of the return signals. If the highest point being illuminated by radar is directly below the air vehicle, then the return signal will come back at the same time to antennas 10B and 10C. On the other hand, if the highest point is off to one side of the air vehicle, the return signal will come back to one antenna (e.g., antenna 10B) before it comes back to the second antenna (e.g., antenna 10C), because the path is longer for the second antenna 10C. The phase or the time of arrival of the return signals at each of the antennas is compared. The greater the distance between the two antennas 10B and 10C, the more accurate the measurements will be. However, as the distance between antennas 10B and 10C increases, one or more phase ambiguities result. The further apart antennas 10B and 10C are spaced, the more phase ambiguities will result. At a typical antenna separation according to the present invention, four or five phase ambiguities occur.

The phase ambiguity problem associated with multiple wavelength antenna separation is solved through the addition of a third antenna 10A spaced from antennas 10B and 10C such that the combination of the three phase comparisons eliminates the ambiguity. The third antenna 10A is referred to as an ambiguity antenna. The ambiguity antenna 10A is positioned very close to one of the other two antennas 10B or 10C, such that there are no phase ambiguities between the ambiguity antenna 10C and the antenna closest to the ambiguity antenna. Because of the small baseline or distance separation between the ambiguity antenna 10A and the antenna closest to the ambiguity antenna, accuracy is lost. Therefore, the widely spaced antennas 10B and 10C are used to provide the necessary accuracy, and the two closely spaced antennas are used to eliminate the phase ambiguities.

The present invention uses two alternative techniques for identifying the highest point in a particular swath. The first technique is referred to as a search-while-process technique, which involves processing more than one swath at a time. The embodiment shown in FIGS. 1 and 2 uses the search-while-process technique. Alternatively, a single swath technique may be used. The single swath technique is discussed below with respect to FIG. 5.

Figure 3:
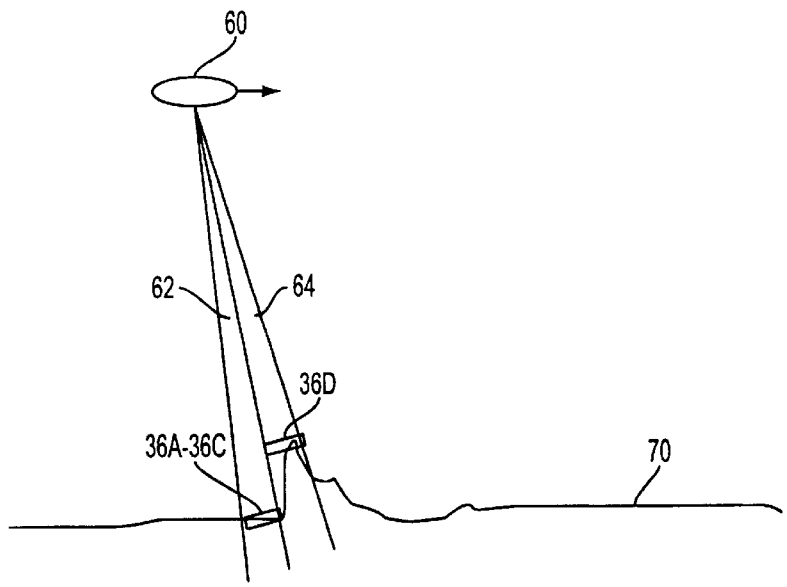
FIG. 3 illustrates the search-while-process technique performed by the radar altimeter of the present invention.

FIG. 3 illustrates the search-while-process technique performed by the radar altimeter of the present invention. As shown in FIG. 3, air vehicle 60 is flying over terrain 70. Range gate/correlators 36A–36C within DSP 30 are fixed on the nearest target in the present doppler swath 62. At the same time, range gate/correlator 36D is searching the slant range to the highest object in the next doppler swath 64. Slant range is essentially the same as time (i.e., the time for a return signal to be received). Control lines 45A and 45B (shown in FIG. 2 and collectively referred to as control lines 45) are used to define the swath characteristics. Computer 33 (shown in FIG. 1) outputs control signals to doppler BPFs 42A–42D on control lines 45 based on air vehicle altitude data from range processor 44 (shown in FIG. 2), and velocity data received from the air vehicle's INS. The doppler frequency and bandwidth for BPFs 42A–42D are adjusted based on the air vehicle velocity and altitude data to obtain appropriate swaths. Computer 33 uses control line 45A to limit doppler BPF 42D to next doppler swath 64, and uses control line 45B to limit doppler BPFs 42A–42C to present doppler swath 62.

After range channel 9D searches and acquires the slant range to the highest point in the next doppler swath 64, range processor 44 sets range gate/correlators 36A–36C to the calculated slant range. Range gate/correlators 36A–36C use the slant range output by range processor 44 when the range gate/correlators 36A–36C get to the next swath.

Figure 4:
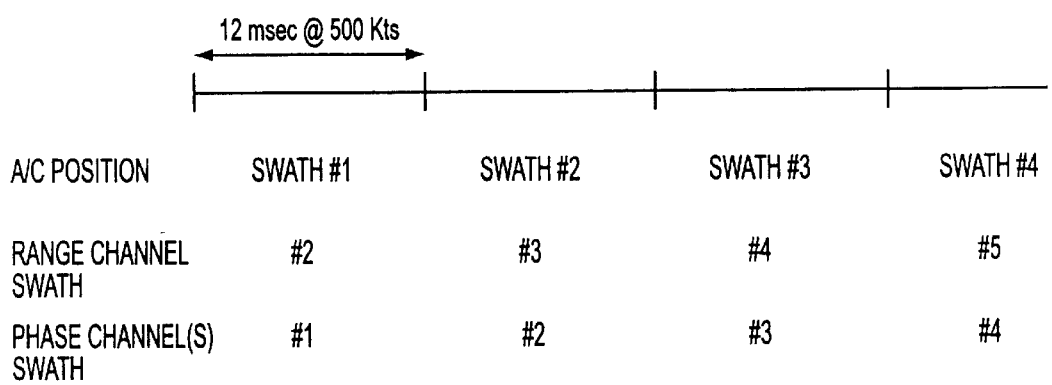
FIG. 4 shows a timing diagram further illustrating the search-while-process function.

FIG. 4 is a timing diagram further illustrating the search-while-process function. In a preferred embodiment, air vehicle 60 is moving at a velocity of approximately 500 knots or about 800 feet per second, so it takes about 12 msec to go through each 10 foot swath. Each column of FIG. 4 represents a 12 msec interval. The 12 msec interval is referred to as a swath interrogation interval. The first row of FIG. 4 indicates the air vehicle or aircraft (A/C) position. The second row of FIG. 4 indicates the swath currently being processed by range channel 9D. The third row of FIG. 4 indicates the swath currently being processed by phase channels 9A–9C. Range channel 9D is always one swath ahead of phase channels 9A–9C. At the end of each 12 msec interval, range channel 9D provides channels 9A–9C with the detected range for the next swath to be processed by channels 9A–9C.

Radar range is determined by the amount of time it takes for a transmitted pulse to hit a target and then return. A range gate, such as that used in range gate/correlators 36A–36D, is essentially a switch that only allows selected samples of the return signal to be processed. In some contexts, a "range gate" implies a switch that may be closed for a finite length of time, but in the digital signal processing context, range gates correspond to discrete samples. The return signal can not get through the range gate until the point in time at which the switch is closed. For example, if a range gate is set to a slant range of 1000 feet, the range gate will wait 2 $\mu$s (which is the amount of time corresponding to a range of 1000 feet) after transmission, and then close to allow the sampled return signal to pass through. Range processor 44 is responsible for setting the slant range of the range gates in range gate/correlators 36A–36D.

Each radar pulse that is transmitted toward the ground returns as a wider signal due to terrain spreading. Digitizers 18A–18C begin sampling and digitizing shortly after a radar signal is transmitted, and output the samples to range gate/correlators 36A–36D. In order to identify the highest point on the ground, the closest or earliest sample with energy must be identified. Digitizer 18A outputs samples from next doppler swath 64 to range channel 9D, where the samples are processed by various components and ultimately received by range processor 44. The processing performed by the various components of range channel 9D is discussed below. Range processor 44 interrogates the samples received from digitizer 18A, and identifies the first sample with energy. The sample number or point in time at which the first sample with energy is obtained is referred to as the slant range to the highest target in that swath. Range processor 44 sets range gate/correlator 36D to the appropriate slant range. In a preferred embodiment, range processor 44 begins its interrogation of the samples received from digitizer 18A at a point in time corresponding to a historic altitude average, which is determined from altitude calculations for previous swaths. Range processor 44 then moves inbound or earlier in time until the first sample with non-zero energy is identified.

During each 12 msec swath interrogation interval, samples from approximately 600 pulses are passed from digitizer 18A to range gate/correlator 36D. For the entire 12 msec, the position of range gate/correlator 36D is moved with respect to the previously determined slant range in an attempt to find the highest point (i.e., the first point with non-zero energy). At the end of the 12 msec interval, range processor 44 sets range gate/correlators 36A–36C to the slant range corresponding to the highest target. Range processor 44 continuously integrates or averages the highest terrain points, effectively filtering the data to provide altitude.

Each channel 9A–9D in DSP 30 includes essentially the same components. In a preferred embodiment, all of the components of DSP 30 are implemented in software, although hardware could also be used. Range gate/correlators 36A–36D phase demodulate the samples received from digitizers 18A–18C. Also, to provide immunity against jammers and intercept receivers and mutual interference from other vehicles, range gate/correlators 36A–36D and word integration band pass filters 38A–38D reject all signals except the signals that were transmitted by transmitter 32. In a preferred embodiment, the signals transmitted by transmitter 32 are phase coded so that return signals with a code different than that transmitted are rejected by correlators 36A–36D and filters 38A–38D. Range gate/correlators 36A–36D demodulate the coded radar return signals and output the sampled return signals to word integration band pass filters 38A–38D. Word integration band pass filters 38A–38D integrate the received samples and generate an intermediate frequency digitally sampled sine wave, which is output to image reject mixers 40A–40D. Word integration band pass filters 38A–38D also function as a correlator, rejecting codes that do not correlate. The demodulation/filter action results in the rejection of undesirable signals.

A frequency reference for image reject mixers 40A–40D is derived from IF offset generator 28. Image reject mixers 40A–40D shift the IF signal received from word integration BPFs 38A–38D down to baseband, and eliminate an undesired side-band (i.e., an image side-band) from the signal. Whenever a signal is down converted, side bands are produced. For example, assuming that a 30 MHz IF carrier signal is used with a positive 5 Hz doppler shift, when the signal is mixed down to baseband, the resulting signal will include plus and minus 5 Hz components. Image reject mixers 40A–40D reject the undesired minus 5 Hz component and output the baseband signal to doppler BPFs 42A–42D.

Doppler BPFs 42A–42C are set to a center frequency corresponding to the doppler shift for the present swath 62. In like manner, doppler BPF 42D is set to a center frequency corresponding to the doppler shift for the next doppler swath 64. The bandwidth for doppler BPFs 42A–42D is set to provide a desired downtrack swath width, such as 10 feet. Each doppler BPF 42A–42C outputs a sine wave. Each sine wave output by doppler BPFs 42A–42C is at the same frequency, but the sine waves will have different phase shifts. Based on the phase differences of the sine waves received from doppler BPFs 42A–42C, phase processor 46 determines the angular position of the highest point in the present swath, including whether the highest point is to the right or the left of the air vehicle. Phase processor 46 also eliminates any phase ambiguity based on phase comparisons of the various input signals. In a preferred embodiment, coarse phase processor 46A determines the phase relation between the signals from doppler BPF 42C and doppler BPF 42A, and outputs an unambiguous but coarse phase relation. Fine phase processor 46C determines the phase relation between the signals from doppler BPF 42C and doppler BPF 42B, and outputs a fine but ambiguous phase relation. Coordinate location processor 46B determines height and horizontal location of the highest point in a swath based on the fine-ambiguous and coarse-unambiguous information from phase processors 46A and 46C, and outputs a target position vector.

Figure 5:
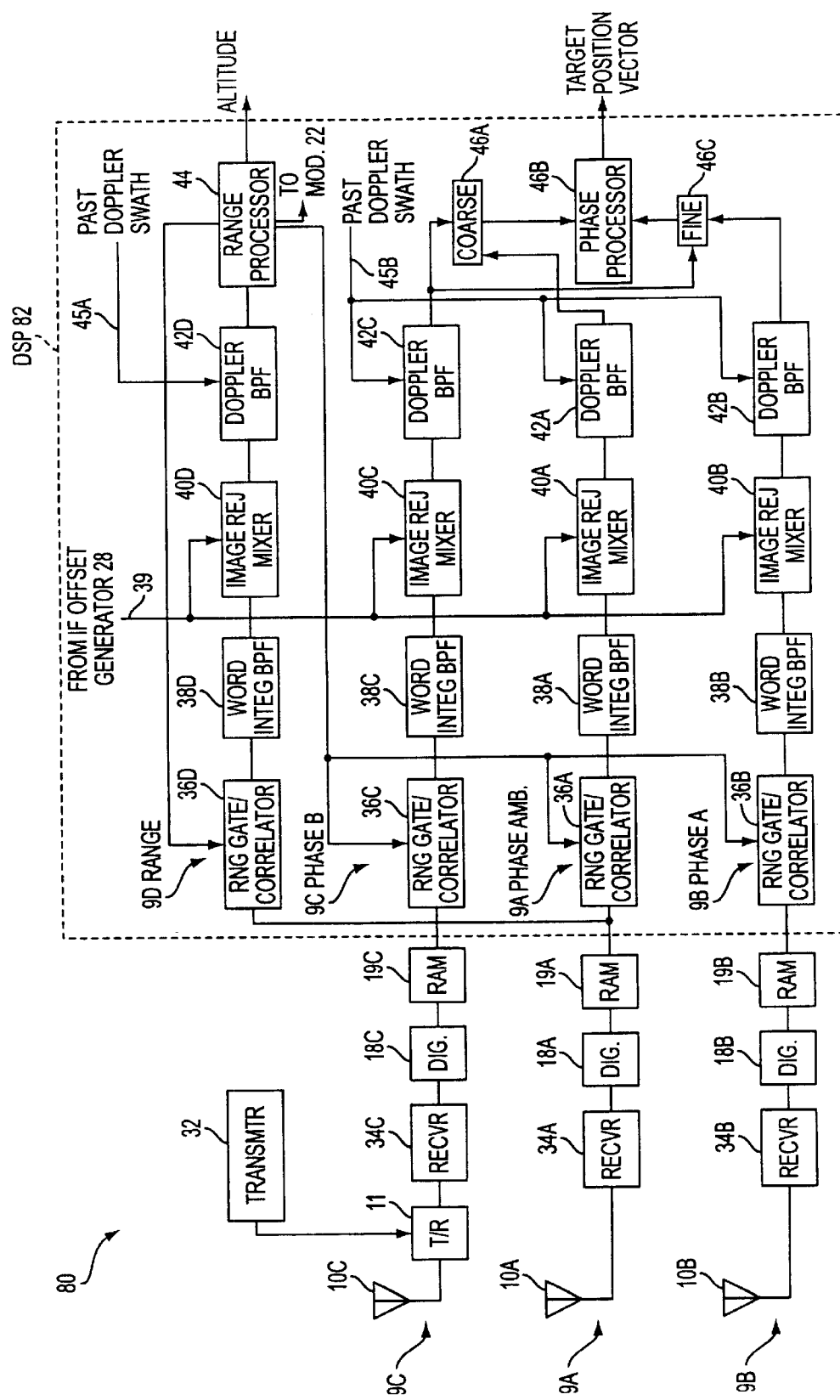
FIG. 5 shows a block diagram of an alternative embodiment of the radar altimeter of the present invention.

FIG. 5 shows an alternative embodiment of the present invention, which utilizes a single swath technique for identifying the highest point within a particular swath. Radar altimeter 80 shown in FIG. 5 is very similar to the embodiment shown in FIGS. 1 and 2, with two primary differences. First, radar altimeter 80 includes random access memories (RAMs) 19A–19C positioned between digitizers 18A–18C and range gate/correlators 36A–36C. Second, control lines 45A and 45B within DSP 82 are both used to select the past doppler swath. Therefore, radar altimeter 80 only processes data from one swath at a time.

Unlike the search-while-process technique in which range channel 9D was one swath ahead of air vehicle 60, and phase channels 9A–9C were at the same swath as air vehicle 60, in the single swath technique, all of the channels 9A–9D are one swath behind the current air vehicle position. As air vehicle 60 flies over a first ground swath, digitizers 18A–18C digitize the return signals for the first ground swath and store the data in RAMs 19A–19C. Range channel 9D and phase channels 9A–9C process the first swath data stored in RAMs 19A–19C as air vehicle 60 is flying over a second swath (i.e., the present swath). Therefore, doppler BPFs 42A–42D are each set to the past doppler swath, or the swath just passed by air vehicle 60. As air vehicle 60 flies over a third swath, the radar return signals for the third swath are stored in RAMs 19A–19C while channels 9A–9D process return signals from the second swath, and so on. Other than the differences described above, radar altimeter 80 operates substantially the same as the embodiment shown in FIGS. 1 and 2 and described above.

The radar altimeter of the present invention may be used in many different applications. For example, the radar altimeter can be used in an unmanned air vehicle. In such an application, an electronic terrain elevation map is stored in the unmanned air vehicle. The unmanned air vehicle compares the output of the radar altimeter of the present invention with the stored terrain elevation map, and determines where the air vehicle is located. The radar altimeter of the present invention may also be used as a back-up to a global positioning system (GPS) in the event that the GPS becomes ineffective due to jamming, signal blockage, or other problems.

Although the present invention has been described with reference to preferred embodiments, workers skilled in the art will recognize that changes may be made in form and detail without departing from the spirit and scope of the invention.

What is claimed is:

1. A radar altimeter for determining altitude of an air vehicle with respect to ground, the radar altimeter comprising:

a transmitter for transmitting radar signals toward the ground;

a first and a second antenna for receiving reflected radar signals from the ground;

a signal processor coupled to the first and the second antennas, the signal processor including filter means for rejecting signals other than signals reflected from a selected ground swath, the signal processor determining the above ground level altitude of the air vehicle based on the radar signals output from the filter means; and phase ambiguity resolution means for resolving phase ambiguities that arise due to multiple wavelength separation of the first and the second antenna.

2. The radar altimeter of claim 1, wherein the signal processor determines the position of the highest point in the selected ground swath.

3. The radar altimeter of claim 1, wherein the phase ambiguity resolution means comprises a third antenna spaced closely to the first antenna such that there are no phase ambiguities between the reflected radar signals received by the third antenna and the first antenna.

4. The radar altimeter of claim 1, wherein the signal processor includes a range channel for calculating the above ground level altitude of the air vehicle with respect to a first ground swath, and includes at least two phase channels for calculating the position of the highest point in a second ground swath, the range channel and the phase channels operating simultaneously.

5. The radar altimeter of claim 4, wherein the range channel provides the phase channels with a slant range for the first ground swath.

6. The radar altimeter of claim 1, and further comprising a memory for storing received radar signals for a first ground swath, the signal processor processing the received radar signals for the first ground swath to determine the above ground level altitude of the air vehicle and the position of the highest point in the first ground swath as the air vehicle flies over a second ground swath.

7. The radar altimeter of claim 1, wherein the signal processor includes means for rejecting signals originating from a source other than the transmitter.

8. A method of determining altitude of an air vehicle with respect to ground, the method comprising:

transmitting radar signals toward the ground;

receiving reflected radar signals from the ground with a first and a second antenna;

filtering the received radar signals to pass only those signals reflected from a selected ground swath;

determining the altitude of the air vehicle based on the radar signals reflected from the selected ground swath; and comparing the reflected radar signals received by the first antenna with signals received by a third antenna to resolve phase ambiguities that arise due to multiple wavelength separation of the first and the second antenna.

9. The method of claim 8, and further comprising:

determining the position of the highest point in the selected ground swath.

10. The method of claim 8, and further comprising:

calculating the above ground level altitude of the air vehicle with respect to a first ground swath using a range channel;

calculating the position of the highest point in a second ground swath using at least two phase channels, the range channel and the phase channels operating simultaneously.

11. The method of claim 10, wherein the range channel provides the phase channels with a slant range for the first ground swath.

12. The method of claim 8, and further comprising:

digitizing received radar signals for a first ground swath;

storing the digitized radar signals for the first ground swath; and processing the digitized radar signals for the first ground swath to determine the above ground level altitude of the air vehicle and the position of the highest point in the first ground swath as the air vehicle flies over a second ground swath.

13. The method of claim 8, and further comprising rejecting signals originating from a source other than the transmitter.

14. A down-looking precision radar altimeter for determining altitude of an air vehicle with respect to ground, the radar altimeter comprising:

a transmitter for transmitting radar signals substantially straight down toward the ground under the air vehicle;

a first and a second antenna for receiving reflected radar signals from the ground, the received radar signals being reflected from terrain on both a left and a right side of the air vehicle;

a signal processor coupled to the first and the second antennas, the signal processor including filter means for rejecting signals other than signals reflected from a selected ground swath, the signal processor determining the above ground level altitude of the air vehicle based on the radar signals output from the filter means.

15. The radar altimeter of claim 14, wherein the signal processor determines the position of the highest point in the selected ground swath.

16. The radar altimeter of claim 14, and further comprising phase ambiguity resolution means for resolving phase ambiguities that arise due to multiple wavelength separation of the first and the second antenna.

17. The radar altimeter of claim 16 wherein the phase ambiguity resolution means comprises a third antenna spaced closely to the first antenna such that there are no phase ambiguities between the reflected radar signals received by the third antenna and the first antenna.

18. The radar altimeter of claim 14, wherein the signal processor includes a range channel for calculating the above ground level altitude of the air vehicle with respect to a first ground swath, and includes at least two phase channels for calculating the position of the highest point in a second ground swath, the range channel and the phase channels operating simultaneously.

19. The radar altimeter of claim 18, wherein the range channel provides the phase channels with a slant range for the first ground swath.

20. The radar altimeter of claim 14, and further comprising a memory for storing received radar signals for a first ground swath, the signal processor processing the received radar signals for the first ground swath to determine the above ground level altitude of the air vehicle and the position of the highest point in the first ground swath as the air vehicle flies over a second ground swath.

21. The radar altimeter of claim 14, wherein the signal processor includes means for rejecting signals originating from a source other than the transmitter.

\* \* \* \* \*